United States Patent [19]

Clark, Jr.

[11] Patent Number: 4,700,033
[45] Date of Patent: Oct. 13, 1987

[54] TURN SIGNAL LEVER REPAIR MOUNTING

[76] Inventor: Bernal H. Clark, Jr., 11453 W. Saginaw, Clio, Mich. 48420

[21] Appl. No.: 792,193

[22] Filed: Oct. 28, 1985

[51] Int. Cl.⁴ .................... H01H 9/00; F16L 13/10; B25G 3/34
[52] U.S. Cl. ................... 200/332; 74/484 R; 74/548; 403/300; 403/361; 29/402.08; 29/402.13; 29/426.5
[58] Field of Search ............... 200/61.27, 61.54, 335, 200/332; 29/402.03, 402.08, 402.13, 426.1, 426.5; 403/11, 17, 300, 305, 361, 265, 287; 74/473 S, 473 W, 484 R, 543, 544, 548; 138/97

[56] References Cited

U.S. PATENT DOCUMENTS

| 2,187,060 | 1/1940 | Schultz | 200/61.27 |
| 2,686,447 | 8/1954 | Vock et al. | 29/402.03 |
| 3,159,049 | 12/1964 | Lahti | 74/544 |
| 3,319,485 | 5/1967 | Tremblay | 200/61.27 |
| 3,334,201 | 8/1967 | Mutschler et al. | 200/61.27 |
| 3,490,132 | 1/1970 | Kosters et al. | 29/402.08 |
| 3,826,521 | 7/1974 | Wilhelmsen | 138/97 |
| 3,996,433 | 12/1976 | Suzuki et al. | 200/61.27 |
| 4,016,380 | 4/1977 | Schawinsky et al. | 200/61.27 |
| 4,159,753 | 7/1979 | Boche | 180/108 |
| 4,273,971 | 6/1981 | Tregurtha | 200/61.27 |
| 4,293,743 | 10/1981 | Iwata et al. | 200/4 |
| 4,638,681 | 1/1987 | Eldridge, Jr. | 74/544 |

Primary Examiner—Charles Frankfort
Assistant Examiner—W. Morris Worth
Attorney, Agent, or Firm—Gifford, Groh, VanOphem, Sheridan, Sprinkle and Dolgorukov

[57] ABSTRACT

A repair kit for repairing a lever switch, such as a turn signal lever. The repair mounting includes a bore dimensioned so as to insertably receive the broken end of the lever arm therein. A correspondingly shaped switch engaging portion is permanently affixed to the sleeve opposite the bore. The lever arm is affixed in the bore by a fastener, threading, adhesive, or the like. The repair kit includes the sleeve, an affixed and correspondingly shaped switch engaging portion, means for manipulating the broken switch engaging portion and removing it from the column, and an adhesive for attaching the broken lever arm to the sleeve.

7 Claims, 5 Drawing Figures

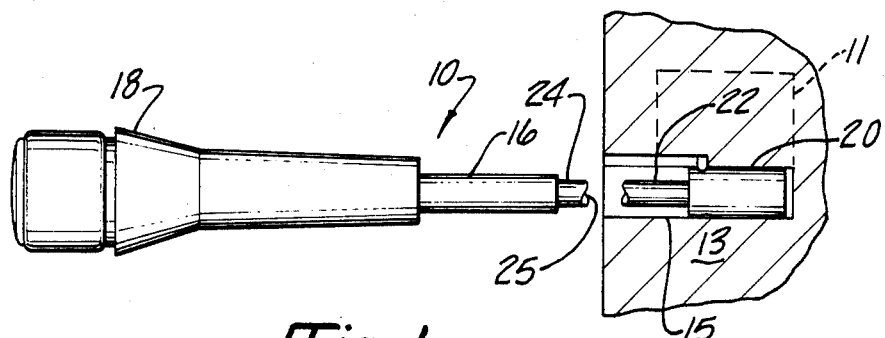
_Fig-1_
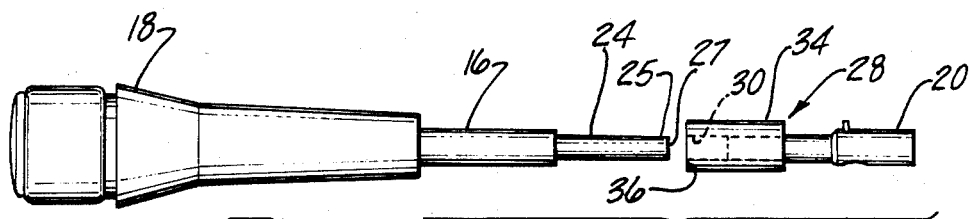
_Fig-2_
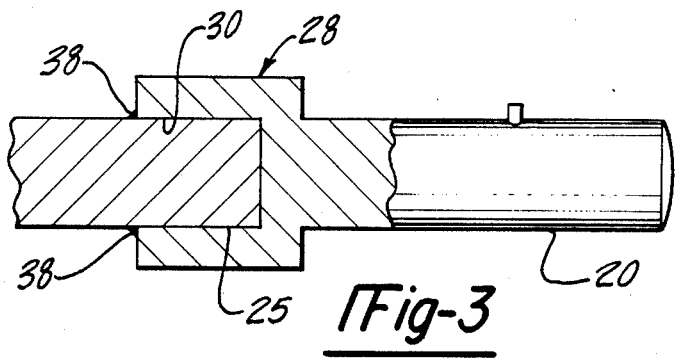
_Fig-3_
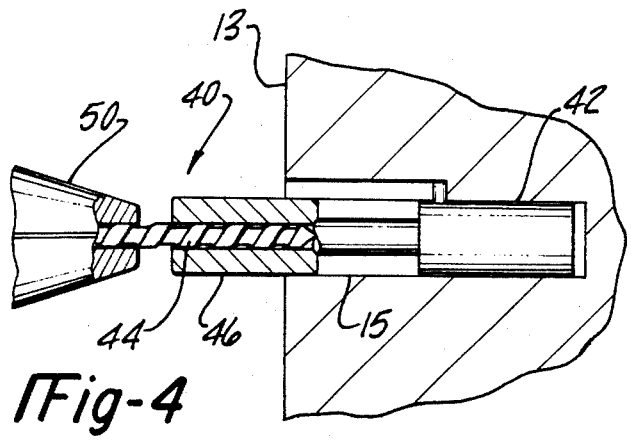
_Fig-4_
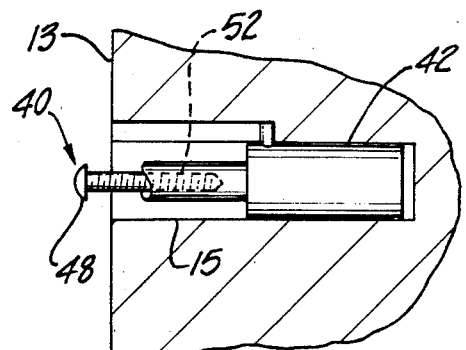
_Fig-5_

TURN SIGNAL LEVER REPAIR MOUNTING

BACKGROUND OF THE INVENTION

I. Field of the Invention

The present invention is directed to switches, and more particularly to a lever switch structure and a kit for repairing the same.

II. Description of the Prior Art

Lever switches have long been used in motor vehicles in order to actuate turn signal indicators, windshield washers and wipers, and the like. Conventionally, these lever switch structures comprise a switch mechanism carried on or in the steering column of the vehicle, and a graspable lever arm attached thereto. The arm includes a switch engaging portion and a graspable end opposite the portion. Conventionally, the lever arm and the switch engaging means are of a one-piece or integral construction. Often, the lever arm includes a portion of reduced diameter near the switch engaging means, or intermediate between the graspable end and the switch engaging means.

While such lever switch structures have functioned adequately for their intended purpose, their use has entailed at least one significant drawback. A conventional turn signal lever arm is subject to breakage and separation from the switch engaging portion. Such breakage can occur through the intentional or unintentional overextension or forcing of the lever arm, in particular, upon impact due to vehicular accident or the like. The lever arm is particularly subject to breakage at the reduced diameter portion, although like any manufactured part, an undetected subsurface fracture can exist at any location. Generally, breakage and separation of the arm from the switch engaging portion will occur at the end of the arm near the switch, since the fulcrum about which the lever arm pivots is usually at or near the switch.

The conventional solution to the problem of a broken turn signal lever has been to replace the separated lever arm and switch engaging portion with a new, integrally formed lever arm and switch engaging portion. This solution, however, is not entirely satisfactory. The cost of the replacement arm and switch engaging portion is relatively high. Particularly for earlier model cars, the availability of an integrally formed replacement arm and switch engaging portion is uncertain. Of course, the replacement arm and switch engaging portion may be subject to deficiencies similar to those which caused the original arm and switch engaging portion to separate.

SUMMARY OF THE PRESENT INVENTION

The present invention overcomes these and other problems by providing a repair mounting for a turn signal lever. The invention includes a lever switch structure comprising the repair mounting, and also includes a kit for repairing broken turn signal levers.

The repair mounting comprises a connecting member, preferably a sleeve, which has an axial bore into which the broken end of the turn signal lever arm is inserted. A switch engaging means or portion, shaped similarly to the original signal engaging portion on the arm, is affixed to the end of the sleeve opposite the arm. Preferably, the switch engaging portion so attached is shaped substantially the same as the original switch engaging portion which has separated from the lever arm.

The repair mounting connecting member can also comprise a sleeve having a throughbore into which the broken portion of the signal engaging means is received. In such a case, the replacement lever comprises the old lever arm and the old switch engaging portion joined by the sleeve.

A repair kit advantageously comprises the connecting member and its attached switch engaging means, along with a means for affixing the broken lever arm to them. Preferably, the kit includes a glue to be placed in the bore in order to permanently fasten the lever arm to the connecting member upon curing, and a means for manipulating the broken switch engaging means and removing it from the steering column.

One particularly preferred embodiment of the repair mounting comprises an integrally formed connecting member and swith engaging portion. The combination connecting member and switch engaging portion includes the bore into which the broken end of the turn signal lever is inserted and fixed. The structure is particularly useful in avoiding breakage, since the reduced diameter portion found on many conventional turn signal levers can be eliminated.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a partial cross-sectional view of a broken turn signal lever to be repaired by the present invention;

FIG. 2 is a perspective view of the preferred embodiment of the present invention;

FIG. 3 is a cross-sectional view of another preferred embodiment of the present invention;

FIG. 4 is a cross-sectional view similar to FIG. 1; and

FIG. 5 is a cross-sectional view similar to FIG. 1.

DETAILED DESCRIPTION OF THE PREFERRED EMBODIMENT OF THE PRESENT INVENTION

With reference now to FIG. 1, a broken turn signal lever or the like 10 is shown. The lever 10 is conventionally attached to a turn indicator switch assembly 11 carried on, or in a bore 15 in, a steering column 13 of a motor vehicle. The particular structure of the switch mechanism 11 is not relevant to the present invention, and is therefore shown only schematically in FIG. 1. The turn signal lever 10 comprises a lever arm 16 having graspable end 18, and a switch engaging portion 20 normally carried on an opposite end 22 of the arm 16. The lever 10 includes a portion 24 of reduced diameter disposed between the switch engaging portion 20 and the lever arm 16. In FIG. 1, the lever 10 has been accidentally broken at the reduced diameter portion 24, such that the switch engaging portion 20 has been separated from the graspable end 18. While the switch engaging portion 20 can be secured to an actuating portion of the switch by a screw or the like, in any of several well known fashions, as shown in the Figures, it is preferably of the type which is insertable into the steering column, as described herein.

The foregoing generally describes both the conventional turn signal lever and the turn signal lever of the present invention (FIG. 2). The improvement of the present invention lies in providing a mounting or connecting member 28 between the lever arm 16 and the switch engaging means 20. The connecting member 28 comprises a portion defining a bore 30 dimensioned to receive a broken end 25 of the broken lever arm 10 therein. A fastening means such as a layer of glue is provided between the lever arm 16 and the connecting member 28 in order to affix the broken end 25 in the bore 30. The bore 30 is preferaby a throughbore in a hollow sleeve 34, and the broken lever arm end 25 is received in one end 36 of the sleeve 34. The broken end 25 can be cut or filed flat (such as at 27) in order to provide the greatest possible surface contact with the bore 30.

Although the switch engaging portion 20 can be fastened in the throughbore 34 in the same or similar fashion as the broken end 25 of the lever arm 16, as can best be seen in FIG. 3 the connecting member 28 and the switch engaging portion 20 can alternatively be integrally formed. The broken end 25 of the lever arm 16 can be affixed in the bore 30 by welds 38 or other means. Such a construction avoids the reduced diameter portion 24 which may have been a disadvantageous site of breakage in the original turn signal lever 10.

The attachment of the switch engaging portion 20 to the connecting member 28 can be done by the repairer. However, as shown in FIGS. 2 and 3, most conveniently the switch engaging portion 20 and the connecting member 28 are preassembled and sold as an integrated unit.

Advantageously, a kit for repairing a broken turn signal lever comprises the integrally formed switch engaging portion 20 and connecting member 28, and a means 40 for removing an old, broken switch engaging portion 42 from the steering column 13. The removing means 40 preferaby comprises a drill bit 44, a drill bit guide 46, and a preferably hardened steel screw 48. The bit 44 has a diameter smaller than the diameter of the reduced diameter portion 24 of the broken switch engaging portion 42. The drill bit guide 46 comprises a hollow sleeve having an outer diameter slightly less than that of the steering column bore 15, but preferaby larger than the diameter of the reduced diameter portion 24. The drill bit guide 46 has an inner diameter slightly larger than but about equal to the diameter of the drill bit 44.

Repair of a broken turn signal lever arm in accordance with the present invention is straightforward. In its broken condition, the broken end 25 of the lever arm 16 is already separated from the broken switch engaging portion 42, which usually remains in the steering column 13 after breaking. If a part of the switch engaging portion 42 protrudes from the column 13, it is grasped in any convenient fashion, such as by a pair of pliers, and manipulated so as to remove it from the column 13. If the broken portion 42 is contained entirely within the column bore 15, so that it cannot be grasped for removal, the portion 42 is drilled for insertion of the screw 48.

First, the drill bit 44 is inserted into the chuck 50 of a conventional hand drill. The guide 46 is placed on the bit 44 in abutment with the drill chuck 50, and the bit 44 is positioned in the chuck 50 so that it protrudes somewhat beyond the end of the guide 46. The distance of protrusion is such as to permit a hole 52 to be drilled by the bit 44 in the broken switch engaging portion 42, deep enough to allow seating of the screw 48 therein. Generally, about one quarter (¼) inch is a sufficient protrusion. Once the bit 44 is set in the drill chuck 50, the bit guide 46 is removed from the bit 44 and inserted into the column bore 15, in abutment with the broken switch engaging portion 42. The drill bit 44 is inserted into the guide and the drill actuated, to drill the hole 52 in the end of the broken switch engaging portion 42. Drilling is stopped when the drill chuck 50 abuts the guide 46, the desired depth of the hole 52 having been achieved. The drill bit 44 and the guide 46 are then removed from the column bore 15, and the steel screw 48 inserted into the hole 52. Once the screw 48 is fastened in the hole 52, it is grasped, either by hand or by a pair of pliers, to remove the broken switch engaging portion 42 from the column bore 15.

The broken switch engaging portion 42 can be affixed to the lever arm 16 by insertion and gluing in the sleeve 34. Preferably, however, the broken switch engaging portion 42 is discarded, and the integrally formed switch engaging portion 20 and connecting member 28 (FIG. 3) is affixed to the lever arm 16. The broken end 25 of the lever arm 16 is cut square at its end 27 to facilitate affixment, which can occur by gluing, welding or the like. About one quarter (¼) inch of the broken end of the lever 16 should be removed by cutting and sanding. The switch lever arm so assembled, is then attached to the steering column and ready for use in its conventional fashion.

The kit for repairing broken switch lever arms comprises the integrally formed switch engaging portion 20 and the connecting member 28; a drill bit 44, a screw 48 and guide 46 having corresponding dimensions; and epoxy for attachment of the connecting member 28 to the lever arm 16.

Of course, the present invention has been described in conjunction with only one of several well known lever switch structures. Although the disclosed switch engaging portion 20 comprises a somewhat elongated rod having a smaller pin disposed perpendicularly at the middle thereof, other switch engaging portions are equally usable. Similarly, a connecting member 28 comprising a sleeve 34 can be used with either a hollow or solid body lever arm 16, the latter being shown in the preferred embodiment for simplicity.

Having described my invention, however, many modifications thereto will become apparent to those skilled in the art to which it pertains, without deviation from the spirit of the present invention, as defined by the scope of the appended claims.

I claim:

1. A kit for the repair of a lever structure normally operatively engaged with a switch, said structure in its normal unbroken state comprising an existing arm connected to an existing switch engaging portion, and said existing arm and said existing switch engaging portion being disconnected from one another when said structure is in a broken state; said kit comprising:
   a connecting member engageable with said existing arm, said member including a portion defining a bore having an open end dimensioned to insertably receive a broken end portion of said existing arm therein;
   a replacement switch engaging portion affixed to said connecting member, shaped in correspondence to said existing switch engaging portion;
   means for fastening said existing arm to said connecting member; and means for manipulating said existing switch engaging portion so as to facilitate removal of said existing switch engaging portion.

2. The invention according to claim 1, wherein said replacement switch engaging portion is carried on said connecting member opposite said open bore end.

3. The invention according to claim 1, wherein said replacement switch engaging portion is insertable into said switch.

4. The invention according to claim 1, wherein said fastening means comprises an adhesive.

5. The invention according to claim 1, wherein said connecting member and said replacement switch engaging portion are integrally formed.

6. the invention according to claim 1, wherein said manipulating means comprises a drill bit, a bit guide, and a screw.

7. A kit for the repair of a broken automobile turn indicator switch lever, said lever being normally operatively engaged with a turn indicator switch in an automobile and in its normal unbroken state comprising an existing arm connected to an existing switch engaging portion inserted into said switch, and said existing arm and said inserted existing switch engaging portion being disconnected from one another when said structure is in a broken state; said kit comprising:

a connecting member comprising a sleeve having a longitudinal bore defining an open bore end dimensioned to insertably receive said existing arm therein;

adhesive means for fastening said existing arm in said open bore end;

a replacement switch engaging portion affixed to said connecting member opposite said open bore end, shaped in correspondence to said existing switch engaging portion and insertable into said switch; and means for manipulating said existing switch engaging portion so as to facilitate its removal from said switch.

* * * * *